(12) United States Patent
Na et al.

(10) Patent No.: US 10,750,379 B2
(45) Date of Patent: Aug. 18, 2020

(54) BASE STATION DEVICE, METHOD FOR OPERATING SAME, AND TERMINAL DEVICE

(71) Applicants: SK TELECOM CO., LTD., Seoul (KR); INDUSTRY-ACADEMIC COOPERATION FOUNDATION, YONSEI UNIVERSITY, Seoul (KR)

(72) Inventors: Min Soo Na, Seongnam-si (KR); Young Lak Kim, Yongin-si (KR); Tak Ki Yu, Yongin-si (KR); Sung Ho Moon, Anyang-si (KR); Tae Guen Kim, Seongnam-si (KR); Yo Seop Park, Anyang-si (KR); Dae Sik Hong, Seoul (KR); Han Ho Wang, Seongnam-si (KR)

(73) Assignees: SK Telecom Co., LTD., Seoul (KR); Industry—Academic Cooperation Foundation Yonsei University, Seoul (KR)

( * ) Notice: Subject to any disclaimer, the term of this patent is extended or adjusted under 35 U.S.C. 154(b) by 189 days.

(21) Appl. No.: 15/327,005

(22) PCT Filed: Jun. 29, 2015

(86) PCT No.: PCT/KR2015/006624
 § 371 (c)(1),
 (2) Date: Jan. 17, 2017

(87) PCT Pub. No.: WO2016/010282
 PCT Pub. Date: Jan. 21, 2016

(65) Prior Publication Data
 US 2017/0366984 A1  Dec. 21, 2017

(30) Foreign Application Priority Data

Jul. 15, 2014 (KR) ......................... 10-2014-0089220
 Jun. 26, 2015 (KR) ......................... 10-2015-0091393

(51) Int. Cl.
 *H04W 24/02* (2009.01)
 *H04W 76/28* (2018.01)
 (Continued)

(52) U.S. Cl.
 CPC ........... *H04W 24/02* (2013.01); *H04L 5/1461* (2013.01); *H04W 24/08* (2013.01); *H04W 76/28* (2018.02);
 (Continued)

(58) Field of Classification Search
 CPC ..... H04W 24/02; H04W 24/08; H04W 76/28; H04W 72/0406; H04W 72/0453;
 (Continued)

(56) References Cited

U.S. PATENT DOCUMENTS

2004/0114545 A1* 6/2004 Edwards ............ H04B 7/15557
 370/294
2012/0147827 A1* 6/2012 Wu ....................... H04L 1/1854
 370/329
(Continued)

FOREIGN PATENT DOCUMENTS

KR 10-2007-0048424 A 5/2007
KR 10-2010-0054362 A 5/2010
(Continued)

OTHER PUBLICATIONS

LG Electronics, 3GPP TSG RAN WG1 Meeting #55, R1-084206 UL/DL band swapping for efficient support of relays in FDD mode, Nov. 10-14, 2008 (Year: 2008).*
(Continued)

*Primary Examiner* — Robert C Scheibel
(74) *Attorney, Agent, or Firm* — Hauptman Ham, LLP (57) ABSTRACT

A base station device includes: a signal receiving unit to receive a downlink signal, which is transmitted from an adjacent base station over a downlink frequency band of a
(Continued)

frame for the adjacent base station, over an uplink frequency band of a silent inverted frame during a first time interval, during which the base station device uses the silence inverted frame; a measuring unit to measure a channel environment with the adjacent base station based on the downlink signal from the adjacent base station; and an interference removing unit configured to remove the signal interference induced from the adjacent base station by removing the downlink signal received from the adjacent base station over a uplink frequency band of the base station device during a second time interval based on the channel environment with the adjacent base station.

6 Claims, 7 Drawing Sheets

(51) Int. Cl.
*H04L 5/14* (2006.01)
*H04W 24/08* (2009.01)
*H04L 5/00* (2006.01)
*H04B 17/345* (2015.01)
*H04W 72/04* (2009.01)
*H04W 88/08* (2009.01)

(52) U.S. Cl.
CPC .......... *H04B 17/345* (2015.01); *H04L 5/0073* (2013.01); *H04W 72/0406* (2013.01); *H04W 72/0453* (2013.01); *H04W 88/08* (2013.01)

(58) Field of Classification Search
CPC .... H04W 88/08; H04L 5/1461; H04L 5/0073; H04B 17/345; H04B 7/26
See application file for complete search history.

(56) References Cited

U.S. PATENT DOCUMENTS

2012/0269115 A1* 10/2012 Esteves ................ H04L 5/0053
370/328
2013/0272170 A1* 10/2013 Chatterjee ............ H04W 28/02
370/280

FOREIGN PATENT DOCUMENTS

| KR | 101016345 B1 * | 2/2011 | ............... H04B 7/26 |
| KR | 10-2011-0092708 A | 8/2011 | |
| KR | 10-2012-0080493 A | 7/2012 | |
| KR | 10-2014-0012893 A | 2/2014 | |

OTHER PUBLICATIONS

International Search Report dated Sep. 15, 2015 for PCT/KR2015/006624.
Korean Office Action dated Mar. 27, 2020 corresponding to Korean Application No. 10-2015-0091393 with English translation.

* cited by examiner

BASE STATION DEVICE, METHOD FOR OPERATING SAME, AND TERMINAL DEVICE

CROSS REFERENCE TO RELATED APPLICATION

This application is the National Phase application of International Application No. PCT/KR2015/006624, filed on Jun. 29, 2015, which is based upon and claims the benefits of priorities under 35 U.S.C § 119(a) of Korean Patent Application No. 10-2014-0089220, filed on Jul. 15, 2014, and Korean Patent Application No. 10-2015-0091393, filed on Jun. 26, 2015, with the Korean Intellectual Property Office (KIPO), the entire contents of which are incorporated herein by reference.

TECHNICAL FIELD

The present disclosure relates to a technique to efficiently remove signal interference between base stations in a network environment where a number of base stations employing FDD coexist.

BACKGROUND ART

Recently, a network environment has emerged where a number of base stations forming cells of different sizes are disposed in the same area in LTE network.

In such network environment, various kinds of small base stations having smaller coverage (cell) than typical macro base stations are disposed/coexist, such that various kinds of base stations form macro cells and small cells in overlapping area to provide communications service for users.

In such network environment where macro cells and small cells coexist, a plurality of small cells may be included in a macro cell.

If macro base stations and small base stations employ frequency division duplex (FDD) in such network environment, the macro base stations and the small base stations use a common frequency band for uplink/downlink transmission. As a result, interference takes place between uplink signals and between downlink signals.

Specifically, interference in downlink transmission takes place due to a downlink signal transmitted from another base station than the base station to which a terminal is connected. In addition, interference in uplink transmission takes place due to an uplink signal transmitted from another terminal connected to another base station than the base station to which the terminal is connected.

Signals working as such interference cannot be understood by a receiving end and thus decrease signal to the interference and noise ratio when they are introduced into a signal to be received. As a result, the quality of the communications service is degraded.

In view of the above, the exemplary embodiments of the present disclosure propose an approach to efficiently remove call interference between base stations employing FDD.

DISCLOSURE

Technical Problem

An object of the present disclosure is to provide a base station device capable of efficiently removing signal interference between base stations in a network environment where a number of base stations employing FDD coexist, a method of operating a base station device, and a terminal device.

Technical Solution

In accordance with one aspect of the present disclosure, a base station device includes: a signal receiving unit configured to receive a downlink signal from an adjacent base station over an uplink frequency band during a first time interval, wherein the adjacent base station is using the uplink frequency band for a downlink frequency band; a measuring unit configured to measure a channel environment with the adjacent base station based on the downlink signal from the adjacent base station; and an interference removing unit configured to remove the downlink signal from the adjacent base station from a signal received over an uplink frequency band during a second time interval based on the channel environment with the adjacent base station.

The adjacent base station and the base station device may use a frame having a structure in which a frequency band allocated for uplink transmission is separated from a frequency band allocated for downlink transmission to transmit/receive signals over an uplink frequency band and a downlink frequency band, respectively.

The base station device may use at least one inverted frame having a structure in which frequency bands are allocated for uplink and downlink transmissions in opposite manner to the adjacent base station, and at least one silence inverted frame having a structure in which a terminal does not transmit an uplink signal in an uplink frequency band in the inverted frame.

The first time interval may be a period of time when the base station device uses the silence inverted frame, and the second time interval may be a period of time when the base station device uses the inverted frame.

The measuring unit may measure the channel environment with the adjacent base station based on a downlink signal of the adjacent base station received over an uplink frequency band during the first time interval and on a transmission signal transmitted from the adjacent base station checked during the first time interval.

The interference removing unit may calculate a signal component of the adjacent base station received over an uplink frequency band during the second time interval based on the channel environment with the adjacent base station and the transmission signal transmitted from the adjacent base station checked during the second time interval, and subtracts the calculated signal component from the signal received over the uplink frequency band during the second time interval to remove the downlink signal from the adjacent base station.

The transmission signal transmitted from the adjacent base station may be a signal checked from the adjacent base station by a backhaul connecting between the base station device and the adjacent base station or by a baseband unit (BU) managing the base station device and the adjacent base station as remote radio units (RUs).

In accordance with another aspect of the present disclosure, a method of operating a base station device includes: receiving a downlink signal from an adjacent base station over an uplink frequency band during a first time interval, wherein the adjacent base station is using the uplink frequency band for a downlink frequency band; measuring a channel environment with the adjacent base station based on the downlink signal from the adjacent base station; and removing the downlink signal from the adjacent base station from a signal received over an uplink frequency band during a second time interval based on the channel environment with the adjacent base station.

The adjacent base station and the base station device may use a frame having a structure in which a frequency band allocated for uplink transmission is separated from a frequency band allocated for downlink transmission to transmit/receive signals over an uplink frequency band and a downlink frequency band, respectively.

The base station device may use at least one inverted frame having a structure in which frequency bands are allocated for uplink and downlink transmissions in opposite manner to the adjacent base station, and at least one silence inverted frame having a structure in which a terminal does not transmit an uplink signal in an uplink frequency band in the inverted frame.

The first time interval may be a period of time when the base station device uses the silence inverted frame, and the second time interval may be a period of time when the base station device uses the inverted frame.

The measuring the channel environment may include: checking the transmission signal transmitted from the adjacent base station during the first time interval; and measuring the channel environment with the adjacent base station based on a downlink signal of the adjacent base station received over an uplink frequency band during the first time interval and on a transmission signal transmitted from the adjacent base station checked during the first time interval.

The removing may include: checking the transmission signal transmitted from the adjacent base station during the second time interval; calculating a signal component of the adjacent base station received over an uplink frequency band during the second time interval based on the channel environment with the adjacent base station and the transmission signal transmitted from the adjacent base station checked during the second time interval; and subtracting the calculated signal component from the signal received over the uplink frequency band during the second time interval to remove the downlink signal from the adjacent base station.

In accordance with another aspect of the present disclosure, a terminal device includes: a signal transmitting/receiving unit configured to use a frame having a structure in which a frequency band allocated for uplink transmission is separated from a frequency band allocated for downlink transmission to transmit/receive signals to/from a base station to which the terminal device is connected over an uplink frequency band and a downlink frequency band, respectively; a checking unit configured to check an inverted frame use time at which the base station uses an inverted frame having a structure in which frequency bands are allocated in the opposite manner to the frame; and a control unit configured to control the signal transmitting/receiving unit so that the inverted frame is used during the inverted frame use time to transmit/receive signals to/from the base station.

The checking unit may check a silence inverted frame use time when the base station uses a silence inverted frame having a structure in which a terminal does not transmit an uplink signal in an uplink frequency band in the inverted frame.

The control unit may control the signal transmitting/receiving unit so that the silent inverted frame is used to transmit/receive signals to/from the base station during the silent inverted frame use time.

The frame, the inverted frame and the silent inverted frame may be sub-frames of a frequency division duplex (FDD) frame.

The inverted frame use time may be based on at least one of location and number of sub-frames in the FDD frame used as the inverted frame checked from control information provided from the base station.

The silent inverted frame use time is based on location and/or number of sub-frames in the FDD frame used as the silent inverted frame checked from control information provided from the base station.

In accordance with another aspect of the present disclosure, a terminal device includes: a signal transmitting/receiving unit configured to use a full duplex (FD) frame having a structure in which a same frequency band is allocated for uplink and downlink transmissions to transmit/receive signals to/from a first base station using a frame having a structure in which frequency bands are allocated for uplink and downlink transmissions separately and a second base station using an inverted frame having a structure in which frequency bands are allocated in the opposite manner to the frame; a checking unit configured to check an silence inverted frame use time at which the second base station uses an s-inverted frame having a structure in which no uplink signal is transmitted in an uplink frequency band of the inverted frame; and a control unit configured to control the signal transmitting/receiving unit so that only an operation of receiving a downlink signal from the first base station over the frequency band of the FD frame is performed during the s-inverted frame use time.

The frame, the inverted frame and the s-inverted frame may be sub-frames of a frequency division duplex (FDD) frame.

The s-inverted frame use time is based on at least one of location and number of sub-frames in the FDD frame used as the s-inverted frame checked from control information provided from the second base station.

Advantageous Effects

According to exemplary embodiments of the present disclosure, in a network environment where a number of base stations employing FDD coexist, signal interference between the base stations can be efficiently removed in a manner appropriate for FDD.

BEST MODE

Hereinafter, exemplary embodiments of the present disclosure will be described with reference to the accompanying drawings.

Figure 1:
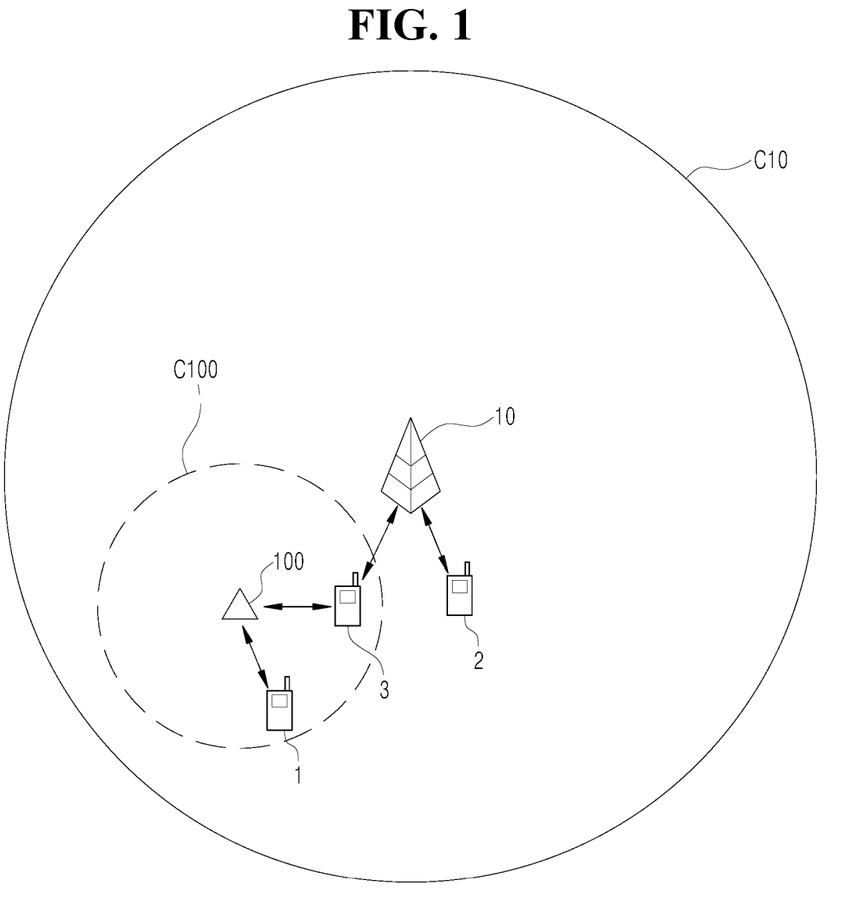
FIG. 1 is a diagram showing a communications system in which a macro cell and a small cell coexist according to an exemplary embodiment of the present disclosure.

FIG. 1 is a diagram showing a communication system to which an exemplary embodiment of the present disclosure is applied, i.e., a communications system in which a macro cell and a small cell coexist.

As shown in FIG. 1, in an environment where a macro cell and a small cell coexist, the small cell C100 may be included in the macro cell C10. It is to be understood that more than one small cells may be included in the macro cell C10. In the following description, only one small cell C100 is included in the marc cell C10 as shown in FIG. 1 for convenience of illustration.

A macro base station 10 forming the macro cell C10 may transmit/receive an uplink signal and a downlink signal to/from a terminal located in the macro cell C10, e.g., the terminal 2 to provide the terminal 2 with communications service, such as voice call service, data service, etc.

In addition, a small base station 100 forming the small cell C100 may transmit/receive an uplink signal and a downlink signal to/from a terminal located in the small cell C100, e.g., the terminal 1 to provide the terminal 1 with communications service, such as voice call service, data service, etc.

When the macro base station 10 and the small base station 100 employ frequency division duplex (FDD) in the environment where the macro cell C10 includes the small cell C100, the macro base station 10 and the small base station 100 use a common frequency band for uplink/downlink transmissions. As a result, signal interference takes place in the uplink/downlink transmission.

In view of the above, exemplary embodiments of the present disclosure propose an approach to efficiently remove signal interference between base stations appropriately for FDD in a network environment where a number of base stations employing FDD coexist.

In the following description, it is assumed that the base station device according to the exemplary embodiment of the present disclosure is a small base station, where the base station device may be the small base station 100 shown in FIG. 1 and an adjacent base station that is likely to have interference with the base station 100 is the macro base station device 10.

It is to be understood that the base station device according to the exemplary embodiment of the present disclosure may also be the macro base station 10 shown in FIG. 1, where the adjacent base station that is likely to have interference with the base station 10 is the small base station 100.

In the following description, the base station device according to the exemplary embodiment of the present disclosure is the small base station 100. In some parts of the descriptions, the base station device 100 may be interchangeably referred to as the small base station 100, and the adjacent base station 10 may be interchangeably referred to as the macro base station 10.

In this exemplary embodiment, the adjacent base station 10, i.e., the macro base station 10 and the base station device 100 according to the exemplary embodiment of the present disclosure, i.e., the small base station 100 employ FDD.

In other words, the macro base station 10 and the small base station 100 employ FDD such that they use a frame having the structure in which frequency bands allocated for uplink transmission are separated from frequency bands for downlink transmission and transmit/receive uplink signals and downlink signals over the uplink frequency bands and downlink frequency bands, respectively.

For a communications system employing FDD, in order to transmit data on a signal, a FDD frame containing data is carried on a signal to be transmitted.

A FDD frame may include a plurality of sub-frames. Herein, a frame may refer to either a FDD frame or one of the sub-frames of a FDD frame.

If the macro base station 10 and the small base station 100 use the common frequency band for uplink/downlink transmissions as in the related art, there would be interference between uplink signals and interference between downlink signals, which happens previously.

Figure 3:
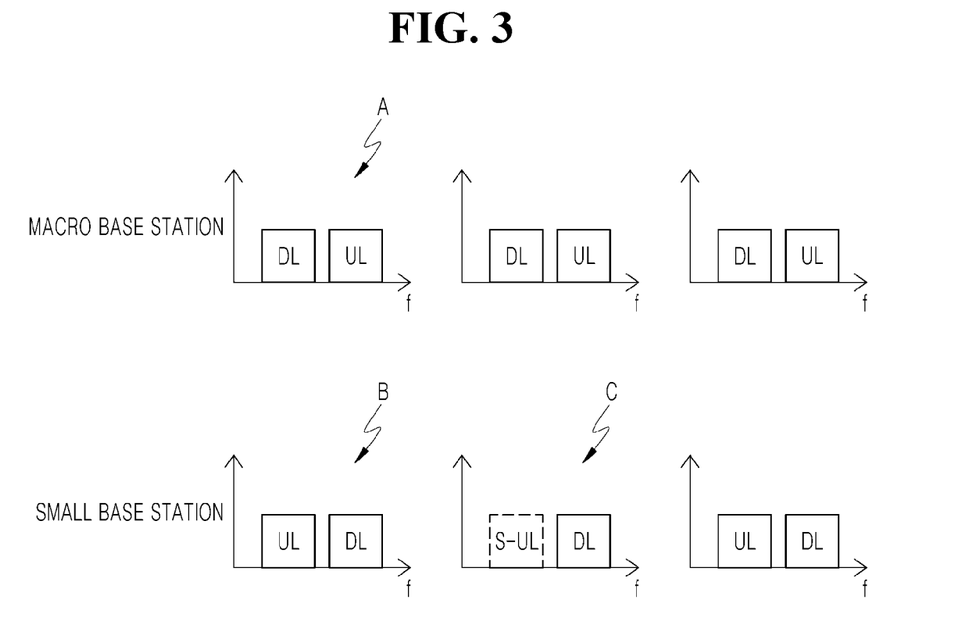
FIG. 3 is a view showing a frame structure used by a base station device according to an exemplary embodiment of the present disclosure.

For example, it may be assumed that the macro base station 10 uses a frame A having the structure shown in FIG. 3 to transmit/receive an uplink signal and a downlink signal over the uplink frequency band and the downlink frequency band, respectively.

Based on this assumption, the macro base station 10 and the small base station 100 using the common frequency band for uplink/downlink transmission means that the small base station 100 also uses the frame A that has the same structure with that of the macro base station 10 to transmit/receive an uplink signal and a downlink signal over the uplink frequency band and the down link frequency band, respectively.

This may result in interference between uplink signals of the macro base station 10 and the small base station 100 and interference between downlink signals of the macro base station 10 and the small base station 100.

In view of the above, exemplary embodiments of the present disclosure propose an approach to remove the signal interference between the uplink signals and the signal interference between the downlink signals.

The base station device 100 according to the exemplary embodiment of the present disclosure, i.e., the small base station 100 transmits/receives an uplink signal and a downlink signal by using an uplink frequency band and a downlink frequency band allocated in the opposite manner to the manner in which the frequency bands are allocated in the adjacent station 10, i.e., the macro base station 10.

More specifically, the exemplary embodiment of the present disclosure proposes an inverted frame having the structure in which frequency bands are allocated for uplink and downlink transmissions in the opposite manner to a reference frame (e.g., the frame of the macro base station 10).

By doing so, the small base station 100 according to the exemplary embodiment of the present disclosure may transmit/receive an uplink signal and a downlink signal over the uplink frequency band and the downlink frequency band, respectively, by using at least one inverted frame having the structure in which frequency bands are allocated for uplink and downlink transmissions in the opposite manner to the frame used by the macro base station 10.

For example, as shown in FIG. 3, if the macro base station 10 uses the frame A having the structure shown in FIG. 3, the small base station 100 according to the exemplary embodiment of the present disclosure uses an inverted frame B that allocates frequency bands in the opposite manner to the frame A in at least one sub-frames in a FDD frame.

In this manner, the macro base station 10 and the small base station 100 use the frame A and the inverted frame B, respectively, and accordingly use uplink frequency band and downlink frequency band allocated in the opposite manner to each other, to transmit/receive an uplink signal and a downlink signal.

The number of the inverted frames B used by the small base station 100 according to the exemplary embodiment of the present disclosure may vary as necessary.

For example, the small base station 100 according to the exemplary embodiment of the present disclosure may use the inverted frame B that is different from the frame A used by the macro base station 10 during a period of time that meets a predetermined condition to remove interference or during a certain period of time in a predetermined cycle, and may use the frame A as the macro base station 10 during the rest of the period of time.

It is to be understood that the small base station 100 according to the exemplary embodiment of the present disclosure may continuously use inverted frames B that are different from the frame A used by the macro base station 10.

As the macro base station 10 and the small base station 100 according to the exemplary embodiment of the present disclosure transmit/receive uplink signals and downlink signals by using uplink frequency bands and downlink frequency bands allocated in the opposite manner to each other, no interference takes place between the uplink signals and between the downlink signals, unlike in the related art.

Incidentally, when the macro base station 10 uses the frame A while the small base station 100 uses the inverted frame B as described above, the uplink frequency band of the small base station 100 is used as the downlink frequency band of the macro base station 10, and thus a downlink signal from the macro base station 10 may be introduced into a signal received by the small base station 100 over an uplink frequency band, in addition to an uplink signal from the terminal 1.

As a result, when the macro base station 10 uses the frame A while the small base station 100 uses the inverted frame B as described above, there may be another kind of interference which takes place as a downlink signal from the macro base station 10 is introduced into a signal received by the small base station 100 over an uplink frequency band.

In view of the above, the exemplary embodiments of the present disclosure propose an approach to solve such a new interference which may take place as the macro base station 10 and the small base station 100 transmit/receive uplink signals and downlink signals by using uplink frequency bands and downlink frequency bands allocated in the opposite manner to each other.

That is, in order to solve such a new interference, an exemplary embodiment of the present disclosure proposes a silence inverted frame (hereinafter referred to as an s-inverted frame) that has a structure different from the structure of the above-described inverted frame in that a terminal does not transmit an uplink signal in an uplink frequency band.

Specifically, referring to FIG. 3, the s-inverted frame C has the structure of the inverted frame that allocates frequency bands in the opposite manner to the reference frame A, with the difference in that another base station and a terminal transmit no signal and remains silent for the radio resource used to transmit a downlink signal from the reference base station, e.g., the macro base station 10, i.e., for the same time and the same frequency band, i.e., the uplink frequency band (S-UL).

Accordingly, the small base station 100 according to the exemplary embodiment of the present disclosure uses at least one s-inverted frame C. It is to be understood that the number of the s-inverted frames C used by the small base station 100 according to the exemplary embodiment of the present disclosure may vary as necessary.

Hereinafter, the configuration of a base station device according to an exemplary embodiment of the present disclosure will be described in detail with reference to FIG. 2.

In the following description, a first time interval refers to a period of time when the base station device 100 according to the exemplary embodiment of the present disclosure uses the above-described s-inverted frame, and a second time interval refers to a period of time when the base station device 100 according to the exemplary embodiment of the present disclosure uses the above-described inverted frame.

Figure 2:
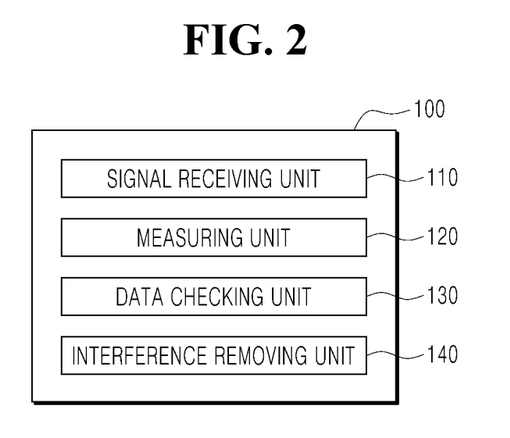
FIG. 2 is a block diagram of a base station device according to an exemplary embodiment of the present disclosure.

As shown in FIG. 2, the base station device 100 according to the exemplary embodiment of the present disclosure, i.e., the small base station 100 includes a signal receiving unit 110, a measuring unit 120 and an interference removing unit 140.

The signal receiving unit 110 receives a downlink signal from an adjacent base station, i.e., the macro base station 10 which is using an uplink frequency band for a downlink frequency band during the first time interval over the uplink frequency band during the first time interval.

In particular, the small base station 100 according to the exemplary embodiment of the present disclosure uses the above-described s-inverted frame C during the first time interval.

The first time interval refers to a period of time when an s-inverted frame C is used for measuring channel environment. For example, it may be a period of time when a predetermined event takes place for measuring channel environment or a period of time when a predetermined interval for measuring channel environment has elapsed.

In the following description, the first time interval is referred to as "s-inverted frame use time" for convenience of illustration.

As such, when the small base station 100 according to the exemplary embodiment of the present disclosure uses the s-inverted frame C during the first time interval, i.e., the s-inverted frame use time, the signal receiving unit 110 may only receive a downlink signal from the macro base station 10 which is using an uplink frequency band as a downlink frequency band at the s-inverted frame use time over an uplink frequency band S-UL in the s-inverted frame C.

The measuring unit 120 measures channel environment with the macro base station 10 based on the downlink signal from the macro base station 10 received at the s-inverted frame use time.

To measure the channel environment with the macro base station 10, the base station device 100 according to the exemplary embodiment of the present disclosure further includes a data checking unit 130 for checking a transmission signal transmitted from an adjacent base station 10, i.e., the macro base station 10.

More specifically, the base station device according to the exemplary embodiment of the present disclosure, i.e., the small base station 100 may be interconnected with the macro base station 10 via a separate backhaul.

The medium of the backhaul may be an optical cable or other types of media.

Or, in a communications system having a structure in which a baseband unit (BU) for managing radio resources and remote radio units (RUs) responsible for physically transmitting/receiving signals are separated from each other, the base station according to the exemplary embodiment of the present disclosure, i.e., the small base station device 100 and the adjacent base station, i.e., the macro base station 10 may correspond to RUs managed by a single BU.

In this case, the small base station 100 according to the exemplary embodiment of the present disclosure may be interconnected with the macro base station 10 via a single BU without a separate backhaul.

In this regard, the data checking unit 130 may check a transmission signal transmitted from the macro base station 10 by using the connection by a backhaul or a BU.

For example, the data checking unit 130 may access a memory (not shown) in a macro base station where information on signals transmitted from the macro base station 10 (e.g., control and data information necessary for demodulating data containing baseband data and bandpass modulation symbol information) is stored to check the transmitted signal.

Alternatively, the macro base station 10 may copy the information on a signal (e.g., control and data information necessary for demodulating data containing baseband data and bandpass modulation symbol information) it transmits in a memory (not shown) in the small base station in advance, and then the data checking unit 130 may access the memory in the small base station to check the transmission signal transmitted from the macro base station 10.

In order to measure the channel environment with the macro base station 10, the data checking unit 130 may check a transmission signal transmitted from the macro base station 10 at the above-described s-inverted frame use time.

The measuring unit 120 may measure a channel environment h with the macro base station 10 based on the downlink signal from the macro base station 10 received at the s-inverted frame use time and on the transmission signal transmitted from the macro base station 10 checked at the s-inverted frame use time.

In measuring the channel environment h, an algorithm is used with the downlink signal from the macro base station 10 and the transmission signal transmitted from the macro base station 10 as parameters. Such an algorithm may be selected from existing measurement algorithms known in the art; and, therefore, detailed description on the process of measuring (calculating) the channel environment h will be omitted.

The reason why the base station device 100 according to the exemplary embodiment of the present disclosure measures the channel environment h with an adjacent base station, i.e., the macro base station 10 will be described in detail below.

The interference removing unit 140 removes the downlink signal from the macro base station 10 from the signal received over the uplink frequency band during a second time interval based on the channel environment h with the adjacent base station 10, i.e., the macro base station 10 measured at the above-described s-inverted frame use time.

During the second time interval, the small base station 100 according to the exemplary embodiment of the present disclosure uses the inverted frame B that is different from the frame A used by the macro base station 10.

The second time interval refers to a period of time when the above-described inverted frame B is used for removing interference. For example, it may be a period of time that meets a predetermined condition to remove interference or a certain period of time in a predetermined cycle.

In the following description, the second time interval is referred to as "an inverted frame use time" for convenience of illustration.

As the small base station 100 according to the exemplary embodiment of the present disclosure uses the inverted frame B during the second time interval, i.e., the inverted frame use time, the interference removing unit 140 removes the downlink signal from the macro base station 10 from the signal received over the uplink frequency band at the inverted frame use time based on the channel environment h with the macro base station 10.

Hereinafter, a process of removing a downlink signal from the macro base station 10 from an uplink signal will be described in detail.

The data checking unit 130 also checks a transmission signal transmitted from the macro base station 10 at the above-described inverted frame use time.

Then, the interference removing unit 140 calculates a signal component from the macro base station 10 received over the uplink frequency band at the inverted frame use time based on the channel environment h with the macro base station 10 and on the transmission signal transmitted from the macro base station 10 checked at the inverted frame use time.

For example, the interference removing unit 140 may calculate the signal component (h*x) of the macro base station 10 by multiplying the previously measured channel environment h with the macro base station 10 by the signal x transmitted from the macro base station 10 checked via the interconnection by the backhaul or a BU as described above, where x denotes the transmission signal transmitted from the macro base station 10 checked at the inverted frame use time.

Subsequently, the interference removing unit 140 may subtract the calculated signal component (h*x) from a signal z received over the uplink frequency band at the inverted frame use time to thereby remove the downlink signal from the macro base station 10.

The signal z received over the uplink frequency band at the inverted frame use time may be equal to the sum of the uplink signal (g*y) from the terminal and the downlink signal (h*x) from the macro base station 10, i.e., (g*y)+(h*x), where h denotes the channel environment between the macro base station 10 and the small base station 100, x denotes the transmission signal transmitted from the macro base station 10, g denotes the channel environment between the terminal connected to the small base station 100, e.g., the terminal 1 and the small base station 100, and y denotes the transmission signal transmitted from the terminal, e.g., the terminal 1.

Accordingly, as described above, when the interference removing unit 140 subtracts the calculated signal component (h*x) from the signal received over the uplink frequency band at the inverted frame use time z=(g*y)+(h*x), the small base station 100 according to the exemplary embodiment of the present disclosure obtains the uplink signal (g*y) from the terminal, from which the interference by the macro base station 10 has been accurately removed. As a result, the quality of the uplink service can be improved.

In this regard, although the small base station 100 can check the signal x transmitted from the macro base station 10 without loss via the connection by a backhaul or a BU, the actual data in the downlink signal from the macro base station 10 received over the uplink frequency band of the small base station 100 may be distorted or damaged due to the channel environment. Accordingly, it is necessary to compensate for a difference between two data values to accurately remove the interference.

For this reason, i.e., in order to compensate for difference between the two data values, the small base station 100 measures the channel environment h with the macro base station 10 in advance to use it when removing the interference.

As described above, the base station device 100 according to the exemplary embodiment of the present disclosure is based on the idea of using the inverted frame that allocates uplink/downlink frequency bands in the opposite manner to the frame used by the adjacent base station 10, which is likely to have interference, thereby mitigating interference between the uplink signals and interference between the downlink signals.

Moreover, the base station device 100 according to the exemplary embodiment of the present disclosure may use the s-inverted frame having a silence uplink frequency band S-UL to measure the channel environment with the adjacent base station 10, and accurately remove the downlink signal from the adjacent base station 10 introduced into the signal received during using the inverted frame based on the previously measured channel environment with the adjacent base station 10. As a result, the interference with the adjacent base station 10 can be removed.

Incidentally, the base station device 100 according to the exemplary embodiment of the present disclosure, i.e., the small base station 100 may notify the terminal 1 connected thereto of the frame it is using, i.e., the frame A, the inverted frame B or the s-inverted frame C.

For example, the small base station 100 may provide periodically or at the occurrence of an event the terminal 1 connected thereto with control information containing the location and/or the number of sub-frames in a FDD frame used as the inverted frame B, and control information containing the location and/or the number of sub-frames in the FDD frame used as the s-inverted frame C.

Accordingly, the terminal 1 may use the same structure of sub-frames with the small base station 100, i.e., the frame A, the inverted frame B or the s-inverted frame C, based on the control information provided from the small base station 100.

Figure 4:
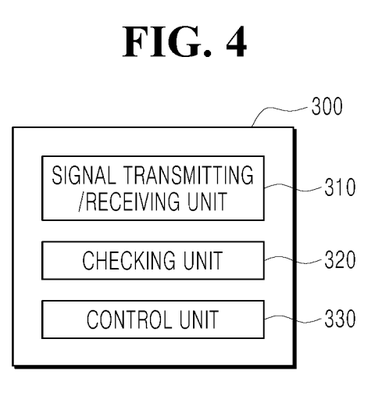
FIG. 4 is a block diagram of a terminal device according to an exemplary embodiment of the present disclosure.

Hereinafter, a terminal device connected to and in communications with the base station device 100 according to an exemplary embodiment of the present disclosure will be described in detail with reference to FIG. 4.

The terminal device according to the exemplary embodiment of the present disclosure corresponds to the terminal 1 shown in FIG. 1. In the following description, the terminal device will be described in detail, with the new reference numeral 300 for convenience of illustration.

The terminal device 300 according to an exemplary embodiment of the present disclosure includes a signal transmitting/receiving unit 310 configured to use a frame in which a frequency band allocated for uplink transmission is separated from a frequency band allocated for downlink transmission to transmit/receive signals to/from a base station that it is connected over an uplink frequency band and a downlink frequency band, respectively; a checking unit 320 configured to check an inverted frame use time at which the base station uses an inverted frame having a structure that allocates frequency bands in the opposite manner to the frame; and a control unit 330 configured to control the signal transmitting/receiving unit 310 so that the inverted frame is used during the inverted frame use time to transmit/receive signals with the base station.

Herein, the base station that the terminal 300 is connected corresponds to the base station device according to the exemplary embodiment of the present disclosure, e.g., the small base station 100 shown in FIG. 1.

The signal transmitting/receiving unit 310 communicates with the base station, i.e., the small base station 100 by FDD such that it uses a frame having the structure in which frequency bands allocated for uplink and downlink transmissions are separated to transmit/receive uplink signals and downlink signals over uplink frequency band and downlink frequency band, respectively.

The small base station 100 normally uses the frame A shown in FIG. 3 as described above.

Accordingly, the signal transmitting/receiving unit 310 communicates with the small base station 100 by FDD such that it normally uses the frame A to transmit/receive uplink signals and downlink signals over uplink frequency band and downlink frequency band, respectively.

The checking unit 320 checks the inverted frame use time, i.e., the time when the base station, i.e., the small base station 100 uses the inverted frame, e.g., the inverted frame B shown in FIG. 3 that allocates the frequency bands in the opposite manner to the frame A.

As described above, the small base station 100 normally uses the frame A and uses the inverted frame B when it is necessary to remove interference, i.e., during the second time interval described above.

Accordingly, the checking unit 320 checks the time when the small base station 100 uses the inverted frame B, i.e., the inverted frame use time, which is the second time interval.

The inverted frame use time checked by the checking unit 320 is based on the location and/or the number of the sub-frames in a FDD frame used as the inverted frames B, obtained from the control information provided from the base station, i.e., the small base station 100.

In other words, the checking unit 320 may check the location and the number of the sub-frames used as the inverted frames B from the control information provided from the small base station 100 as described above, and may determine the inverted frame use time when the small base station 100 uses inverted frames B based on the location and number of the sub-frames used as the inverted frames B.

The control unit 330 controls the signal transmitting/receiving unit 310 so that it transmits/receives signals to/from the small base station 100 by using the inverted frames B at the inverted frame use time.

That is, the control unit 330 controls the signal transmitting/receiving unit 310 so that it transmits/receives signals to/from the small base station 100 by using the inverted frames B while the small base station 100 is using the inverted frame B.

In addition, the checking unit 320 checks the s-inverted frame use time when the base station, i.e., the small base station 100 uses a silence inverted frame having the structure in which a terminal does not transmit an uplink signal in an uplink frequency band of the inverted frame B, i.e., the s-inverted frame C.

As described above, the small base station 100 uses the s-inverted frame C when it is necessary to measure the channel environment, i.e., during the first time interval described above.

Accordingly, the checking unit 320 checks the time when the small base station 100 uses the s-inverted frame C, i.e., the s-inverted frame use time, which is the first time interval.

The s-inverted frame use time checked by the checking unit 320 is based on the location and/or the number of the sub-frames in a FDD frame used as the s-inverted frames C, obtained from the control information provided from the base station, i.e., the small base station 100.

In other words, the checking unit 320 may check the location and the number of the sub-frames used as the s-inverted frames C from the control information provided from the small base station 100 as described above, and may determine the s-inverted frame use time when the small base station 100 uses s-inverted frames C based on the location and number of the sub-frames used as the s-inverted frames C.

The control unit 330 controls the signal transmitting/receiving unit 310 so that it transmits/receives signals to/from the small base station 100 by using the s-inverted frames C at the s-inverted frame use time.

That is, the control unit 330 controls the signal transmitting/receiving unit 310 so that it transmits/receives signals to/from the small base station 100 by using the s-inverted frames C while the small base station 100 is using the s-inverted frame C.

In this manner, the terminal 300 may use the same structure of sub-frames with the small base station 100, i.e., the frame A, the inverted frame B or the s-inverted frame C, based on the control information provided from the base station that it is connecting, i.e., the small base station 100.

Incidentally, as can be seen from FIG. 1, when the macro base station 10 uses the frame A while the small base station 100 uses the inverted frame B as described above, there may be a terminal 3 that is connected both to the macro base station 10 and small base station 100 to transmit/receive signals to/from them.

In this case, the terminal 3 may transmit/receive signals to/from the macro base station 10 and the small base station 100 by using frames in full duplex (FD) mode that allocates the same frequency bands for uplink and downlink transmissions.

Also in this case, the base station device 100 according to the exemplary embodiment of the present disclosure, i.e., the small base station 100 may notify the terminal 3 connected thereto of the frame it is using, i.e., the frame A, the inverted frame B or the s-inverted frame C.

For example, the small base station 100 may provide periodically or at the occurrence of an event the terminal 3 connected thereto with control information containing the location and/or the number of sub-frames in a FDD frame used as the inverted frame B, and control information containing the location and/or the number of sub-frames in the FDD frame used as the s-inverted frame C.

In this manner, the terminal 3 can control the utilization of the FD frames based on the control information provided from the small base station 100.

Figure 5:
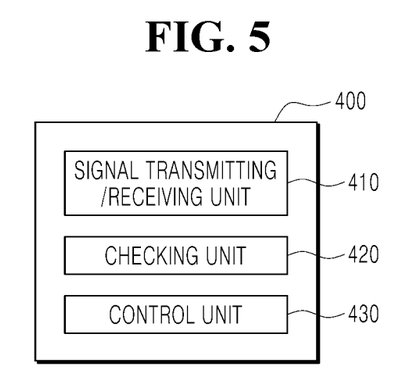
FIG. 5 is a block diagram of a terminal device according to another exemplary embodiment of the present disclosure.

Hereinafter, a terminal device connected to and in communications with the base station device 100 according to an exemplary embodiment of the present disclosure will be described in detail with reference to FIG. 5.

The terminal device according to the exemplary embodiment of the present disclosure corresponds to the terminal 3 shown in FIG. 1. In the following description, the terminal device will be described in detail, with the new reference numeral 400 for convenience of illustration.

The terminal device 400 according to an exemplary embodiment of the present disclosure includes: a signal transmitting/receiving unit 410 configured to use a FD frame having the structure in which the same frequency bands are allocated for uplink and downlink transmissions to transmit/receive signals to/from a first base station using a frame having the structure in which frequency bands are allocated for uplink and downlink transmissions separately and a second base station using an inverted frame having the structure in which frequency bands are allocated in the opposite manner to the frame; a checking unit 420 configured to check an s-inverted frame use time at which the second base station uses a silence-inverted frame having a structure in which no uplink signal is transmitted in an uplink frequency band of the inverted frame; and a control unit 430 configured to control the signal transmitting/receiving unit 410 so that it only receives a downlink signal from the first base station over the frequency band of the FD frame during the s-inverted frame use time.

Hereinafter, it is assumed that the first base station is the macro base station 10 and the second base station is the base station device according to the exemplary embodiment of the present disclosure, e.g., the small base station 100 shown in FIG. 1.

The signal transmitting/receiving unit 410 may transmit/receive signals to/from the first base station, i.e., the macro base station 10 and the second base station, i.e., the small base station 100 by using frames in full duplex (FD) mode that allocates the same frequency bands for uplink and downlink transmissions.

At this time, the macro base station 10 uses the frame A shown in FIG. 3 as described above.

On the other hand, the small base station 100 normally uses the frame A as described above, uses the inverted frame B when it is necessary to remove interference, i.e., at the above-described second time interval, and uses the s-inverted frames C when it is necessary to measure the channel environment, i.e., at the above-described first time interval.

Figure 6:
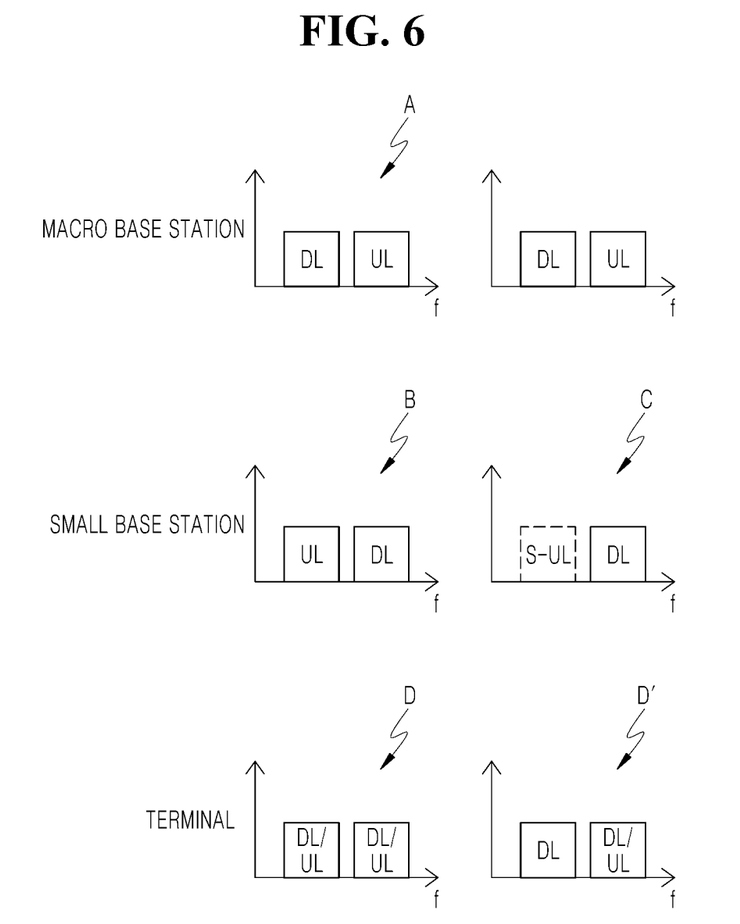
FIG. 6 is a view showing a frame structure used by a terminal device according to another exemplary embodiment of the present disclosure.

As shown in FIG. 6, when the macro base station 10 uses the frame A while the small base station 100 uses the inverted-frame B, the terminal device 400 according to the exemplary embodiment of the present disclosure may be connected to the macro base station 10 and the small base station 100 and may be operated in a FD mode in which it uses FDD frames D that allocate the same frequency bands for uplink and downlink transmissions, as shown in FIG. 6.

As such, it is assumed that the terminal device 400 according to the exemplary embodiment of the present disclosure is operated in the FD mode.

Accordingly, when the macro base station 10 uses the frame A while the small base station 100 uses the inverted frame B, the signal transmitting/receiving unit 410 uses FDD frames D to simultaneously perform the operation of receiving a downlink signal from the macro base station 10 and the operation of transmitting an uplink signal to the small base station 100 in the frequency band that the macro base station 10 has allocated for downlink transmission and in the frequency band that the small base station 100 has allocated for uplink transmission, respectively.

In addition, when the macro base station 10 uses the frame A while the small base station 100 uses the inverted frame B, the signal transmitting/receiving unit 410 uses FDD frames D to simultaneously perform the operation of transmitting an uplink signal to the macro base station 10 and the operation of receiving a downlink signal from the small base station 100 in the frequency band that the macro base station 10 has allocated for uplink transmission and the small base station 100 has allocated for downlink transmission, respectively.

In addition, the checking unit 420 checks the s-inverted frame use time when the second base station, i.e., the small base station 100 uses a silence inverted frame having the structure in which the terminal does not transmit an uplink signal in an uplink frequency band of the inverted frame B.

As described above, the small base station 100 uses the s-inverted frame C when it is necessary to measure the channel environment, i.e., during the first time interval described above.

Accordingly, the checking unit 420 checks the time when the small base station 100 uses the s-inverted frame C, i.e., the s-inverted frame use time (which is the first time interval).

The s-inverted frame use time checked by the checking unit 420 is based on the location and/or the number of the sub-frames in a FDD frame used as the s-inverted frames C, obtained from the control information provided from the second base station, i.e., the small base station 100.

In other words, the checking unit 420 may check the location and the number of the sub-frames used as the s-inverted frames C from the control information provided from the small base station 100 as described above, and may determine the s-inverted frame use time when the small base station 100 uses s-inverted frames C based on the location and number of the sub-frames used as the s-inverted frames C.

The control unit 430 controls the signal transmitting/receiving unit 410 so that it performs only the operation of receiving downlink signals from the first base station, i.e., the macro base station 10 over the frequency band of the FD frames at the s-inverted frame use time.

That is, the control unit 430 control the signal transmitting/receiving unit 310 so that the terminal 400 uses the FD frame D' having the structure in which the frequency band that the macro base station 10 allocated for downlink transmission and the small base station 100 allocated for uplink transmission is allocated for downlink transmission only as shown in FIG. 6, such that it only receive a downlink signal from the macro base station 10 and does not transmit an uplink signal to the small base station 100 over the frequency band of the FD frame D' during the s-inverted frame C used by the small base station 100.

In this manner, the terminal 400 according to the exemplary embodiment of the present disclosure can control the utilization of FD frames in the FD mode based on the control information from the second base station, i.e., the small base station 100.

As described above, according to the exemplary embodiments of the present disclosure, in a network environment where a number of base stations employing FDD coexist, the base station device and the terminal device use frames having the novel structure for FDD, i.e., the inverted frame and the s-inverted frame, such that signal interference between the base stations can be efficiently removed in a manner appropriate for FDD.

Figure 7:
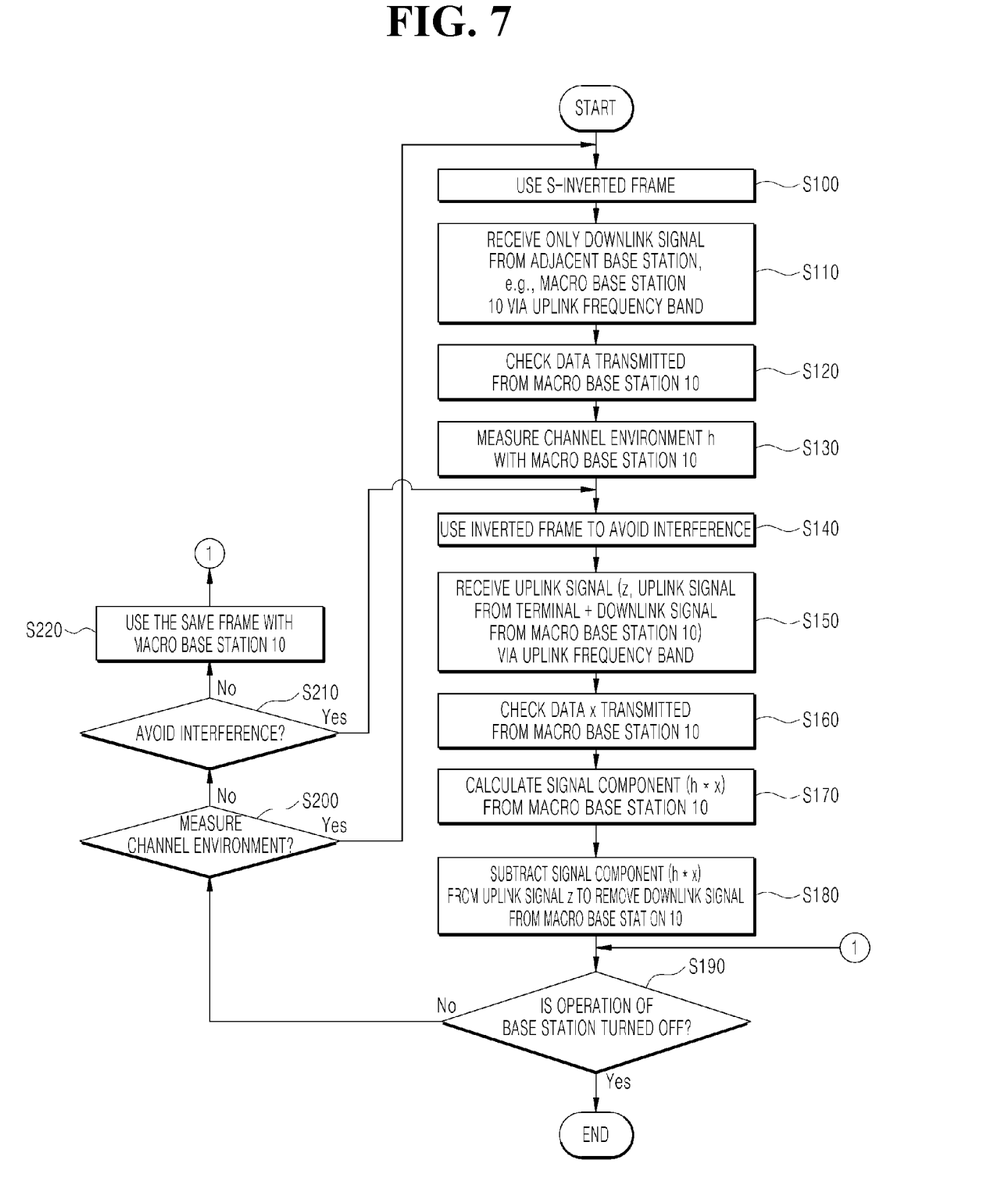
FIG. 7 is a flowchart for illustrating a method of operating a base station device according to an exemplary embodiment of the present disclosure.

Hereinafter, a method of operating a base station device according to an exemplary embodiment of the present disclosure will be described with reference to FIG. 7.

For convenience of illustration, the base station device according to the exemplary embodiment of the present disclosure is the small base station 100. In some parts of the descriptions, the base station device 100 may be interchangeably referred to as the small base station 100, and the adjacent base station 10 may be interchangeably referred to as the macro base station 10.

In addition, in the following description, it is assumed that the time for measuring the channel environment, i.e., the first time interval is followed by the time for removing the interference, i.e., the second time interval or the inverted frame use time, for convenience of illustration.

The method of operating the base station device 100 according to an exemplary embodiment of the present disclosure includes receiving only a downlink signal from an adjacent base station, i.e., the macro base station 10 that is using an uplink frequency band for a downlink frequency band during the first time interval over the uplink frequency band during the first time interval.

More specifically, the method includes using the above-described s-inverted frame C when it reaches the first time interval (step S100).

In other words, when it reaches the first time interval, for example, when a predetermined event set for measuring channel environment occurs or when a predetermined interval for measuring channel environment elapses, the s-inverted frame C may be used.

When the s-inverted frame C is used during the first time interval, the method includes receiving only a downlink signal from the macro base station 10 which is using an uplink frequency band for downlink frequency band during the first time interval over the uplink frequency band S-UL in the s-inverted frame C during the first time interval (step S110).

In addition, the method includes checking a transmission signal transmitted from the macro base station 10 during the first time interval by using the connection by a backhaul or a BU when it reaches the first time interval (step S120).

Then, the method may include measuring a channel environment h with the macro base station 10 based on the downlink signal from the macro base station 10 received during the first time interval and on the transmission signal transmitted from the macro base station 10 checked during the first time interval (step S130).

In addition, the method may include using the inverted frame B that is different from the frame A used by the macro base station 10 during the second time interval other than the first time interval, i.e., during the above-described inverted frame use time (step S140).

In other words, the inverted frame B that is different from the frame A may be used by the macro base station 10 at the inverted frame use time, e.g., during a period of time that meets a predetermined condition set for removing interference or a certain period of time in a predetermined cycle (step S140).

By using the inverted frame B at the inverted frame use time, the method may include receiving a downlink signal from the macro base station 10 which is using an uplink frequency band for downlink frequency band at the inverted frame use time over the uplink frequency band in the inverted frame B, in addition to the uplink signal from terminal 1 (step S150).

In addition, the method includes checking a transmission signal transmitted from the macro base station 10 at the inverted frame use time by using the connection by a backhaul or a BU at the inverted frame use time (step S160).

Then, the method includes calculating a signal component from the macro base station 10 received over the uplink frequency band at the inverted frame use time based on the channel environment h with the macro base station 10 and on the transmission signal transmitted from the macro base station 10 checked at the inverted frame use time (step S170).

For example, The method may include calculating the signal component ($h*x$) of the macro base station 10 by multiplying the previously measured channel environment h with the macro base station 10 by the signal x transmitted from the macro base station 10, where x denotes the transmission signal transmitted from the macro base station 10 checked at the inverted frame use time (step S170).

Subsequently, the method may include subtracting the calculated signal component ($h*x$) from a signal z received over the uplink frequency band at the inverted frame use time to thereby remove the downlink signal from the macro base station 10 (step S180).

The signal z received over the uplink frequency band at the inverted frame use time may be equal to the sum of the uplink signal ($g*y$) from the terminal and the downlink signal ($h*x$) from the macro base station 10, i.e., ($g*y$)+($h*x$), where h denotes the channel environment between the macro base station 10 and the small base station 100, x denotes the transmission signal transmitted from the macro base station 10, g denotes the channel environment between the terminal connected to the small base station 100, e.g., the terminal 1 and the small base station 100, and y denotes the transmission signal transmitted from the terminal, e.g., the terminal 1.

Accordingly, as described above, by subtracting the calculated signal component (h*x) from the signal received over the uplink frequency band at the inverted frame use time z=(g*y)+(h*x), the uplink signal (g*y) from the terminal is obtained, from which the interference by the macro base station 10 has been removed. As a result, the quality of the uplink service can be improved.

Subsequently, the method includes determining whether the operation of the base station is turned off (step S190). If not (No in step S190), it proceeds to determining whether it has reached the first time interval for measuring channel environment (step S200). If so, it returns to step S100, otherwise it proceeds to determining whether it is the inverted frame use time (step S210). If so, it proceeds to step S140, otherwise it proceeds to using the same frame A with the macro base station 10 (step S220).

As described above, according to exemplary embodiments of the present disclosure, in a network environment where a number of base stations employing FDD coexist, signal interference between the base stations can be efficiently removed in a manner appropriate for FDD.

The method of operating a base station device according to an exemplary embodiment of the present disclosure may be implemented as program instructions that may be executed by various types of computers and may be stored in a computer-readable medium. The computer-readable medium may include program instructions, data files, data structure or the like alone or a combination thereof. The program instructions stored on the medium may be ones specially configured for the present disclosure or any ones well known and available to those skilled in the field of computer software. Examples of the computer-readable storage medium may include magnetic media such as a hard disk, a floppy disk and a magnetic tape; optical media such as a CD-ROM and a DVD; magneto-optical media such as a floptical disk; and hardware devices specially configured to store and execute program instructions, such as a ROM, a RAM, a flash memory or the like. Examples of the program instructions may include machine language codes such as ones being made by compilers as well as high-level language codes capable of being executed by computers using interpreters or the like. The hardware devices may be configured to be operated as one or more software modules to perform operations according to the exemplary embodiments of the present disclosure, or vise versa.

Although the exemplary embodiments of the present disclosure have been described for illustrative purposes, those skilled in the art will appreciate that various modifications, additions and substitutions are possible without departing from the scope and spirit of the present disclosure as defined by the appended claims. Such modifications, additions and substitutions are also construed as falling within the scope of the present disclosure.

The invention claimed is:

1. A base station device for removing signal interference induced from an adjacent base station in a network system which is communicated with a terminal by sharing common frequency resources therebetween, using a frequency band's configuration, structure of which includes a frame, an inverted frame and a silence inverted frame over which both the base station device and the adjacent base station communicate with a terminal, the base station device comprising:
   a transceiver configured to use the frequency band's configuration to transmit signals to the terminal and receive signals from the terminal and the adjacent base station, respectively; and
   a processor configured to control the transceiver in order to transmit the signals transmitted to the terminal and receive the signals from the terminal and the adjacent base station,
wherein
   the frame, the inverted frame and the silence inverted frame have a common frequency range to share for uplink and downlink transmission signals,
   the frame is used by the adjacent base station and has a structure for including a first uplink frequency band and a first downlink frequency band,
   the inverted frame is used by the base station device and has a structure inverted to the frame of the adjacent base station so that the inverted frame has an inverted structure for including a second downlink frequency band and a second uplink frequency band which are opposite to the uplink frequency band and the downlink frequency band included in the frame of the adjacent base station,
   the silence inverted frame is used by the base station device and has a silence inverted structure for including the second downlink frequency band and a silence uplink frequency band,
   the first uplink frequency band and the second downlink frequency band have a first common frequency ranges, and
   the first downlink frequency band, the second uplink frequency band, and the silence uplink frequency band have a second common frequency ranges,
wherein the processor does not transmit a signal while the silence uplink frequency band is in use, and
wherein the processor is configured to:
   when the silence inverted frame is used by the base station,
      receive a first downlink signal, which is transmitted from the adjacent base station over the first downlink frequency band of the frame for the adjacent base station, over the silence uplink frequency band of the silence inverted frame during the first time interval, and
      measure a channel environment with the adjacent base station based on the received first downlink signal from the adjacent base station; and
   when the inverted frame is used by the base station,
      remove the signal interference induced from the adjacent base station by removing, from signals received over the second uplink frequency band of the base station device, a second downlink signal transmitted from the adjacent base station during a second time interval based on the measured channel environment with the adjacent base station.

2. The base station device of claim 1, wherein the processor measures the channel environment with the adjacent base station based on
   (i) the first downlink signal, transmitted from the adjacent base station over the first downlink frequency band of the frame for the adjacent base station, received over the silence uplink frequency band of the silence inverted frame for the base station device during the first time interval and
   (ii) a transmission signal of the adjacent base station further received from the adjacent base station by a backhaul connecting between the base station device and the adjacent base station or by a baseband unit (BU) managing the base station device and the adjacent base station as remote radio units (RUs) during the first time interval.

3. The base station device of claim 2, wherein the processor calculates a signal component of the adjacent base station received over the second uplink frequency band during the second time interval based on the measured channel environment with the adjacent base station and the transmission signal of the adjacent base station further received during the second time interval, and subtracts the calculated signal component from the signal received over the second uplink frequency band of the inverted frame for the base station during the second time interval to remove the second downlink signal transmitted from the adjacent base station.

4. A method of removing signal interference induced from an adjacent base station in a network system which is communicated with a terminal by sharing common frequency resources therebetween, using a frequency band's configuration, structure of which includes a frame, an inverted frame and a silence inverted frame over which both a base station device and the adjacent base station communicate with a terminal, the method performed by the base station device having a transceiver configured to use the frequency band's configuration to transmit signals to the terminal and receive signals from the terminal and the adjacent base station, respectively and a processor configured to control the transceiver in order to transmit the signals transmitted to the terminal and receive the signals from the terminal and the adjacent base station, the method comprising:

receiving, when the silence inverted frame is used by the base station, a first downlink signal, which is transmitted from the adjacent base station over a first downlink frequency band of a frame assigned for the adjacent base station, over a silence uplink frequency band of the silence inverted frame assigned for the base station device during a first time interval, wherein the frame, the inverted frame and the silence inverted frame have a common frequency range to share for uplink and downlink transmission signals, the frame is used by the adjacent base station and has a structure for including a first uplink frequency band and the downlink frequency band, the inverted frame is used by the base station device and has a structure inverted to the frame of the adjacent base station so that the inverted frame has an inverted structure for including a second downlink frequency band and second uplink frequency band which are opposite to the first uplink frequency band and the first downlink frequency band included in the frame of the adjacent base station, the silence inverted frame is used by the base station device and has a silence inverted structure for including the second downlink frequency band and the silence uplink frequency band the first uplink frequency band and the second downlink frequency band have a first common frequency ranges, and the first downlink frequency band, the second uplink frequency band, and the silence uplink frequency band have a second common frequency ranges;

measuring, when the silence inverted frame is used by the base station, a channel environment with the adjacent base station based on the received first downlink signal from the adjacent base station; and when the inverted frame is used by the base station, removing the signal interference induced from the adjacent base station by removing, from signals received over the second uplink frequency band of the base station device, a second downlink signal transmitted from the adjacent base station during a second time interval based on the measured channel environment with the adjacent base station wherein the processor does not transmit a signal while the silence uplink frequency band is in use.

5. The method of claim 4, wherein the measuring the channel environment comprises:

further receiving a transmission signal transmitted from the adjacent base station during the first time interval through a backhaul connecting between the base station device and the adjacent base station or through a baseband unit (BU) managing the base station device and the adjacent base station as remote radio units (RUs) during the first time interval; and measuring the channel environment with the adjacent base station based on
(i) the first downlink signal, transmitted from the adjacent base station over the first downlink frequency band of the frame for the adjacent base station, received over the silence downlink frequency band of the silence inverted frame for the base station device during the first time interval and
(ii) the transmission signal of the adjacent base station further received from the adjacent base station.

6. The method of claim 5, wherein the removing comprises:

calculating a signal component of the adjacent base station received over the second uplink frequency band during the second time interval based on the measured channel environment with the adjacent base station and the transmission signal of the adjacent base station; and subtracting the calculated signal component from the signal received over the second uplink frequency band during the second time interval to remove the second downlink signal transmitted from the adjacent base station.

* * * * *